United States Patent [19]

Laine

[11] 4,412,851

[45] Nov. 1, 1983

[54] CRYOGENIC APPARATUS SUITABLE FOR OPERATIONS IN ZERO GRAVITY

[75] Inventor: Robert Laine, NL Wassenaar, France

[73] Assignee: Agence Spatiale Europeene, Paris, France

[21] Appl. No.: 347,651

[22] Filed: Feb. 10, 1982

[30] Foreign Application Priority Data

Mar. 2, 1981 [FR] France ............................... 81 04086

[51] Int. Cl.[3] ......................... B01D 19/00; F17C 7/02

[52] U.S. Cl. ......................................... 55/160; 55/195; 62/51; 62/55; 62/55.5

[58] Field of Search ......................... 55/160, 189, 195; 62/50–53, 55, 55.5

[56] References Cited

U.S. PATENT DOCUMENTS

| | | | |
|---|---|---|---|
| 2,502,525 | 4/1950 | Krugler | 62/50 X |
| 3,091,096 | 5/1963 | Randos et al. | 62/52 |
| 3,105,361 | 10/1963 | Bell et al. | 62/50 |
| 3,216,209 | 11/1965 | Krigsman | 62/52 X |
| 3,257,780 | 6/1966 | Webb | 55/160 |
| 3,729,946 | 5/1973 | Massey | 62/51 |
| 3,788,040 | 1/1974 | Bragg et al. | 55/160 |
| 4,334,410 | 6/1982 | Drumare | 62/55 X |

*Primary Examiner*—Robert H. Spitzer

*Attorney, Agent, or Firm*—James Creighton Wray

[57] ABSTRACT

The invention relates to cryogenic apparatus of the open cycle kind comprising a reservoir 1 for storing cryogenic fluid in liquid-vapor phase equilibrium and a phase separator 2 presenting an inlet 3 communicating with the inside of the reservoir and an outlet 4 for liberating gas, the inlet including an obturator 6.

The technical problem is to provide an apparatus of simple operation with minimal dissipated energy.

According to the invention, the phase separator 2 comprises a transfer chamber 9 with a constriction 5 at its inlet, and a further obturator 8 at its outlet, the two obturators 6,8 being operated alternately by a control unit 10.

The invention is particularly applicable to zero-gravity operation, especially for space missions.

20 Claims, 1 Drawing Figure

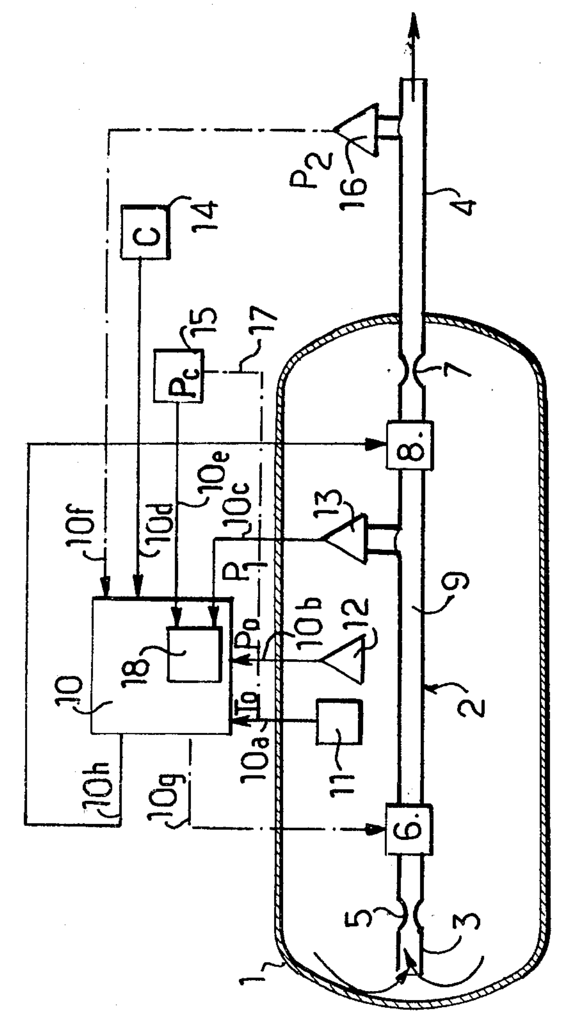
C
14
Pc
15
17
P2
16
4
7
8.
6.
9
2
3
5
1
10
18
10a
10b
10c
10d
10e
10f
10g
10h
11
12
13
P1
Po
To

CRYOGENIC APPARATUS SUITABLE FOR OPERATIONS IN ZERO GRAVITY

FIELD OF THE INVENTION

The present invention relates to cryogenic apparatus and especially to so-called open-cycle cryogenic apparatus comprising a reservoir for storing cryogenic fluid in phase equilibrium between the liquid and gas phases, and a phase separator presenting an inlet for receiving mixed fluid from the reservoir and an outlet for liberating gas, the inlet being provided with an obturator valve.

Such apparatus is especially suitable for use in zero gravity conditions such as those obtaining during space missions. Indeed, cooling of detectors, or other elements in the useful load, to low or very low temperatures is required in many programs or projects for scientific or commercial space missions.

Such low temperatures can be obtained by cryogenic processes and apparatus. The usage as refrigerating means of the vapourisation of a cryogenic liquid or a mixed cryogenic fluid comprising a liquid in equilibrium with its vapour is of special interest for space missions. According to the liquid used, these processes cover a temperature range from 1,5 to 77° K. The cooling capacity of the apparatus and its useful life depend on the mass and volume of cryogenic fluid embarked, as well as the thermal insulation of the cryostat store, and the energy dissipated in the cryostat.

However, one of the problems relating to cryogenic methods and apparatus using cyogenic liquids in the absence of gravity is the impossibility of knowing in advance which fluid phase will appear at the outlet of the cryostat, whereas on earth the separation between gas and liquid phases can normally be obtained naturally under gravity. It follows that, in the absence of gravity, it is necessary to provide means for separating the two phases to enrich the proportion of gas in the fluid liberated, and preferably ensures that only gas is liberated.

DESCRIPTION OF THE PRIOR ART

Apparatus of this kind is known, for example from the article by P. M. SELZER, W. M. FAIRBANK and C. W. F. EVERITT in the review "Advanced Cryogenic Engineering" volume 16 (1971) page 277, in which the phase separator presents a capillarity circuit where the separation occurs by the thermo-mechanical effect, gas evacuation flow rate being controlled by a valve.

Apparatus of this kind is also known, for example, from the article by R. C. MITCHELL, J. A. STARK and R. C. WHITE in the same review, volume 12, (1967) page 72 and from the article by J. A. STARK and M. H. BLATT in the same review volume 14 (1969) page 146, in which the phase separator presents a heat exchanger disposed between its inlet and its outlet, and the obturator valve is permanently open during operation, whether or not the valve also controls the fluid flow rate, and forms a constriction.

OBJECT OF THE INVENTION

The object of the present invention is to provide an installation of the above kind using an obturator mechanism whose operation, and if desired control, is as simple as possible because (among other reasons) of the difficulty in obtaining sufficiently good seal when the obturator is closed without requiring forces which are too high, and hence obtaining minimum dissipation of energy in the stored cryogenic fluid.

DESCRIPTION OF THE INVENTION

Accordingly, the present invention provides a cryogenic apparatus of the open cycle kind comprising a reservoir for storing a cryogenic fluid in liquid-vapour phase equilibrium, and a phase separator comprising an inlet for receiving fluid from within said reservoir and an outlet for liberating fluid outside, said inlet including inlet obturator means for closing and opening said inlet, characterized in that said phase separator comprises a transfer chamber between said inlet and said outlet, said inlet presenting a constriction, and said outlet including outlet obturator means for closing and opening said outlet, and control means for alternately closing and opening said obturator means in sequence, whereby to admit fluid from said reservoir into said transfer chamber, and subsequently to liberate said fluid from said transfer chamber.

With this arrangement, the two obturator valves are never simultaneously open and the liquid cannot pass directly from the reservoir to the exterior. Moreover, the inlet constriction ensures that while the inlet obturator is open, the fluid flow through the inlet constriction is proportional to the pressure drop through the constriction and inversely proportional to the absolute viscosity of the fluid, in accordance with the equation:

$$\dot{M} = \frac{sTZ}{L} \cdot \Delta P \cdot \left(\frac{\rho}{\eta}\right)$$

in which $\dot{M}$ is the net mass flow rate, L the liquid density, s the specific entropy, T the temperature, Z a dimensional coefficient relating to the constriction, $\Delta P$ the pressure drop and $\eta$ the absolute viscosity; now since the fluid involved is an equilibrium mixture of gas and liquid phases, and the kinetic viscosity of the liquid is much higher than that of the saturated vapour, the mass flow rate of the fluid through the inlet constriction will be different for gas and liquid appearing at the inlet, which favours accumulation of gas rather than liquid in the transfer chamber. The gas accumulated in the transfer chamber, after passing through the inlet obturator and constriction during the time that the obturator is open, is subsequently liberated to the exterior by opening the outlet obturator (with the inlet obturator closed).

In a particularly advantageous embodiment of the invention, the storage reservoir and the transfer chamber can be disposed in direct thermal coupling. In this way, any liquid in the transfer chamber is in an unstable state, and evaporates, so that it can be arranged for gas alone to be liberated at the outlet. This instability is due to the fact that, in constant conditions, the temperatures in the storage reservoir ($T_0$) and in the transfer chamber ($T_1$) are substantially equal ($T_0=T_1$) because of the thermal coupling, and provided that the pressure ($P_1$) in the transfer chamber is less than the pressure ($P_0$) in the reservoir ($P_1<P_0$) and that it never rises at high. Maintaining this latter condition requires that it is established at the start when the apparatus is brought into service (initial conditions), and moreover that the mass ($\Delta m$) of liquid admitted into the transfer chamber during the time that the inlet obturator is open is small enough for the pressure ($P_1$) in the chamber never to rise as high as the reservoir pressure ($P_0$) even after evaporation of the liquid inside the chamber. The opening sequence of the inlet and outlet obturators ensures that the outlet obturator is normally open while obturator is closed, closes automatically when the inlet obturator opens, and remains closed not only during the time that the inlet obturator is open but also during a period of simultaneous closure $\Delta t$ which ensures complete vapourisation of any liquid admitted by the inlet obturator into the chamber. The sequence is also arranged so that, given the limitation of fluid flow imposed by the inlet constriction, the inlet obturator opening time is short enough to limit the mass ($\Delta m$) of liquid admitted to the chamber to a small enough value (as mentioned above) even if pure liquid appears at the inlet.

Advantageously, the control means controlling the opening and closing of the obturators is responsive to a reference value for the pressure in the transfer chamber, being a value intermediate between the pressure within the reservoir and the external pressure, the pressure within the transfer chamber being measured and the control means comprising a comparator for comparing the measured pressure with the reference value to control the opening of the inlet obturator. In this way, the repetitive sequence can be arranged so that the inlet obturator is closed while the pressure $P_1$ in the transfer chamber is above the reference value $P_C$, and opens as soon as $P_1$ drops below $P_C$. The difference or margin between the reference value $P_C$ and the pressure $P_0$ in the reservoir is defined as a function of the volume of the transfer chamber and of the maximum incremental mass ($\Delta m$) of liquid which may be admitted by the inlet.

Preferably, and also in accordance with the invention, the control means can also be responsive means generating a signal controlling the time for which the inlet obturator is open.

The evaporation of liquid while the two obturators are closed causes the pressure to rise in the transfer chamber above the reference value, and the outlet obturator then opens. The value of the time control signal, and thus the length of time before the inlet obturator closes, is defined as a function of the volume of the transfer chamber, the pressure $P_0$ in the reservoir, the temperature $T_0$ in the reservoir and the physical characteristics of the fluid used, and in certain cases this signal can be constant.

BRIEF DESCRIPTION OF THE DRAWINGS

Other features and advantages of the invention will appear from the following description by way of non-limitative example, with reference to the accompanying drawing which is a schematic diagram of apparatus according to a particular embodiment of the invention.

DESCRIPTION OF THE EMBODIMENT

This apparatus includes a closed storage reservoir 1 in which a cryogenic fluid is contained in liquid-gas phase equilibrium, such for example as liquid hydrogen or liquid helium.

It also comprises a tubular phase separator 2, disposed within the reservoir 1 and having an inlet end 3 within and communicating with the inside of the reservoir, while its opposite end 4 forms an outlet projecting through the wall of the reservoir and communicating with the exterior so as to form a gas liberation outlet.

A short distance from its inlet end 3, the tube 2 has a constriction section or throttle 5 while, at a short distance from the constriction, on the other side of it from the inlet, an electrovalve 6 is interposed in the tube forming a first obturator member. Likewise, a short distance from the point where the tube 2 goes through the reservoir wall towards the outlet, and within the reservoir, the tube 2 comprises a second constriction section or throttle 7, while at a short distance from this constriction and on the opposite side of it to the outlet is interposed in the tube an electrovalve 8 forming a second obturator member. The arrangement of the two electrovalves 6 and 8 delimits within the tube 2 a transfer chamber 9 which extends between the two electrovalves, over the major part of the tube's length. Because of the position of the tube, the volume within the transfer chamber 9 can exchange heat with the volume inside the reservoir 1.

The apparatus is controlled by a unit controlling the alternate opening and shutting of the obturators, with simultaneous shutting between the opening of the inlet and the next opening of the outlet. The control means comprises a circuit 10, for example of electro-pneumatic kind contained in a housing outside the reservoir 1. This control circuit comprises six inputs, an input 10*a* connected to a temperature sensitive pick-up 11 within the reservoir 1 and generating a signal representing the temperature $T_0$ obtaining inside the reservoir, a second input 10*b* connected to a manometer 12 also disposed inside the reservoir and supplying the value of the pressure $P_0$ obtaining within the reservoir, a third input 10*c* connected to a second manometer 13 associated with the transfer chamber 9 and producing the value of the pressure $P_1$ obtaining inside the transfer chamber, a fourth input 10*d* connected to means 14 generating a control signal for the time that the inlet electrovalve is open, a fifth inlet 10*e* connected to means 15 producing the value of a reference pressure $P_C$ intermediate between the pressure $P_0$ in the reservoir and the pressure $P_2$ outside, and lastly a sixth inlet 10*f* connected to a third manometer 16 associated with the outlet 4 of the tube 2 and producing the value of the external pressure $P_2$. The inlets 10*b*, 10*c*, 10*d*, 10*e* and 10*f* producing the values of pressure are connected to pneumatic tubes, while the inputs 10*a* and 10*d* are connected to electrical terminals. The connection to the input 10*a* also has a branch 17 connecting the temperature pick-up 11 to the reference pressure generator 15. The control unit 10 also has two outputs 10*g* and 10*h* which are connected by electrical connections to the two electrovalves 6 and 8 respectively. The control unit 10 includes a comparator 18 whose inputs are connected to the two inputs 10*c* and 10*e* mentioned above.

The cryogenic apparatus described forms part of a larger working unit, of course, and thus in particular the storage reservoir 1 forms a cryostat which can be placed advantageously in thermal contact with instruments or other parts to be refrigerated, embarked on a space craft.

The operation of the apparatus is as follows.

The cryogenic fluid used is stored in liquid-vapour equilibrium at a temperature $T_0$ and a pressure $P_0$, while the external pressure, outside the reservoir, has a value $P_2$ lower than $P_0$. A mixture of liquid-vapour in random proportions at pressure $P_0$ appears at the inlet 3 to the phase separator tube 2, while gas alone is to be liberated at the tube outlet 4, at the pressure $P_2$.

Before the apparatus is brought into service, no reference signal is given by the device 15 and the control unit 10 maintains the two electrovalves 6 and 8 shut.

That is the situation at any random moment before the apparatus is put into service.

At a chosen moment $t_1$, the device 15 is actuated so as to supply a reference signal $P_C$ which is applied to the control unit 10. This signal is then compared with the pressure signal $P_1$ produced by the manometer 13. Assuming that before the apparatus is brought into service the transfer chamber was put under a pressure $P_1$ intermediate between the reference value $P_C$ and the reservoir pressure $P_0$, the comparator 18 then registers that $P_1>P_C$ and controls then the opening of the outlet valve 8, the inlet valve 6 remaining closed.

Since the outlet valve 8 is open, the pressure $P_1$ in the transfer chamber 9 reduces and tends towards the value $P_2$ of the external pressure. During this reduction in the pressure $P_1$, at a moment $t_2$ it becomes less than the reference value $P_C$ and the comparator 18 then causes the outlet electrovalve 8 to close, then the inlet valve 6 to open. Following this instant $t_2$, the control signal C produced by the device 14 and received by the control unit 10 causes the inlet valve 6 to remain open during a period of time $\Delta t$ which is a function of the value of the control signal C. Once this period of time $\Delta t$ has elapsed, at a moment $t_2+\Delta t$, the control unit 10 causes the inlet valve 6 to close so that both the valves are shut simultaneously.

During the period $\Delta t$ mentioned above, a quantity of fluid from the reservoir penetrated into the transfer chamber 9 and this fluid comprises in part a quantity $\Delta m$ of liquid which then evaporates inside the transfer chamber and raises the pressure inside it. At a time $t_3$ after $t_2+\Delta t$, that is to say when the complete evaporation of the liquid has occurred, the pressure $P_1$ is greater than or equal to the reference value $P_C$ defined by the device 15 and the control unit 10 causes the outlet valve 8 to open.

Because the outlet valve 8 is open, the pressure $P_1$ reduces again and tends towards the value $P_2$, and as soon as it drops below the the reference value $P_C$, the cycle starts again, in the same way as described above, at the moment $t_2$ with the closure of the outlet valve 8 then the opening of the inlet valve 6.

The operation of the two valves can thus be represented schematically by the following table:

| | Inlet valve | Outlet valve |
|---|---|---|
| $t = O$ | C | C |
| $t = t_1$ | C | O |
| $t = t_2$ | O | C |
| $t = t_2 + \Delta t$ | C | C |
| $t = t_3$ | C | O |

It can be arranged, just before the moment $t_2$ for a dead time or delay to occur in which both valves are simultaneously closed to avoid any risk of both valves being open simultaneously.

The control signal C supplied by the device 14 can be variable, and the period $\Delta t$ and the mass $\Delta m$ of liquid admitted then are also variable, but it can also be arranged for this signal to have a constant value. It is determined as a function, among others, of the volume $V_1$ of the transfer chamber 9, of the pressure $P_0$ and of the temperature $T_0$ obtaining in the reservoir 1 as well as the physical characteristics of the cryogenic liquid used.

This operation assumes firstly that in the initial conditions the pressure in the chamber 9 is less than that in the reservoir 1, $P_1<P_0$. Moreover, the dimensions of the orifice 5 and the period of time $\Delta t$ for which the inlet valve 6 is open (determined by the value of the control signal C) must be arranged so that even if pure liquid appears at the orifice 5, the incremental mass $\Delta m$ of liquid admitted into the chamber 9 during the period $\Delta t$ is not sufficient for the pressure $P_1$ in the chamber to reach the value $P_0$. The presence of the outlet constriction 7 ensures also that the pressure in the chamber is maintained constantly above the external pressure $P_2$ so that in permanent operation, the relation $P_0>P_1>P_2$ is always true. The maintenance of this condition, associated with the maintenance of substantial equality between the temperatures in the chamber and in the reservoir, $T_1=T_0$, because of the direct thermal coupling of the tube 2 to the inside of the reservoir 1 avoids any risk of stagnation of the liquid inside the chamber. It follows then that only gas can leave by the evacuation 4 of the phase separator 2.

The value of the reference pressure $P_C$ can be regulatable, which enables the flow of gas leaving to be varied. The margin to leave between the values of the reference pressure $P_C$ and the reservoir pressure $P_0$ is determined by the maximum incremental mass $\Delta m$ which may be admitted by the inlet valve 6, given the volume $V_1$ of the chamber 9 and so that, as indicated above, the pressure $P_1$ in the chamber cannot reach the value $P_0$ during evaporation of this incremental mass $\Delta m$.

In a variant of this embodiment, the volume of the transfer chamber 9 comprises a high conductivity material presenting a large heat exchange area to the fluid, such as copper wool, so as to improve the thermal exchanges between the fluid contained in this chamber and the fluid contained in the reservoir.

I claim:

1. Cryogenic apparatus of the open cycle kind comprising a reservoir for storing a cryogenic fluid in liquid-vapour phase equilibrium, and a phase separator comprising an inlet for receiving fluid from within said reservoir and an outlet for liberating fluid outside, said inlet including inlet obturator means for closing and opening said inlet, characterized in that said phase separator comprises a transfer chamber disposed within said reservoir between said inlet and said outlet, said inlet presenting a constriction and said outlet including outlet obturator means for closing and opening said outlet, and control means for alternately closing and opening said obturator means in sequence, whereby to admit fluid from said reservoir into said transfer chamber, and subsequently to liberate said fluid from said transfer chamber.

2. Apparatus as claimed in claim 1, characterized in that the contents of said transfer chamber are thermally coupled with the contents of said reservoir.

3. Apparatus as claimed in claim 2, characterized in that said transfer chamber comprises a tube disposed within said reservoir.

4. Apparatus as claimed in 1, characterized in that said control means includes reference means defining a reference pressure intermediate between the pressure inside said reservoir and the external pressure, and means responsive to the relative values of the pressure within said transfer chamber and said reference pressure for opening at least one of said obturator means.

5. Apparatus as claimed in claim 4, characterized in that said reference means is regulatable.

6. Apparatus as claimed in claim 4, characterized in that said reference means is responsive to the temperature within said reservoir.

7. Apparatus as claimed in 1, characterized in that said control means includes time control means for controlling the length of time said inlet obturator is open.

8. Apparatus as claimed in 1, characterized in that said control means includes delay means for maintaining both said inlet and outlet obturators closed after admission of fluid into said chamber and before its liberation.

9. Apparatus as claimed in 1, characterized in that said outlet also includes a constriction.

10. Apparatus as claimed in claim 9, characterized in that said inlet constriction is disposed upstream of said inlet obturator means and said outlet constriction is disposed downstream of said outlet constriction.

11. Cryogenic apparatus of the open cycle kind comprising a reservoir for storing a cryogenic fluid in liquid-vapour phase equilibrium, and a phase separator comprising an inlet for receiving mixed phase fluid from within said reservoir and an outlet for liberating fluid outside, said inlet including inlet obturator means for closing and opening said inlet, characterized in that said phase separator is disposed within said reservoir and comprises a transfer chamber between said inlet and said outlet, said inlet presenting a constriction and said outlet including outlet obturator means for closing and opening said outlet, and control means for alternatively closing and opening said inlet and outlet obturator means in sequence, whereby to admit fluid from said reservoir into said transfer chamber, to allow liquid in said transfer chamber to evaporate at a pressure intermediate between the reservoir pressure and the outlet pressure, and subsequently to liberate said fluid from said transfer chamber.

12. Apparatus as claimed in claim 11, characterized in that said control means includes reference means defining a reference pressure intermediate between the pressure inside said reservoir and the external pressure, and means responsive to the relative values of the pressure within said transfer chamber and said reference pressure for opening at least one of said obturator means.

13. Apparatus as claimed in claims 11 or 12, characterized in that said control means includes time control means for controlling the length of time said inlet obturator is open.

14. Apparatus as claimed in claim 12, characterized in that said control means includes delay means for maintaining both said inlet and outlet obturators closed after admission of fluid into said chamber and before its liberation.

15. Apparatus as claimed in claim 14, characterized in that said outlet also includes a constriction.

16. Apparatus as claimed in claim 15, characterized in that said inlet construction is disposed upstream of said inlet obturator means and said outlet constriction is disposed downstream of said outlet constriction.

17. Apparatus as claimed in claim 12, characterized in that said reference means is regulatable.

18. Apparatus as claimed in claim 12, characterized in that said reference means is responsive to the temperature within said reservoir.

19. Apparatus as claimed in claim 11, characterized in that the contents of said transfer chamber are intimately thermally coupled with the contents of said reservoir.

20. Apparatus as claimed in claim 19, characterized in that said transfer chamber comprises a tube disposed within said reservoir.

* * * * *